United States Patent
Hsieh

(10) Patent No.: US 8,480,003 B2
(45) Date of Patent: Jul. 9, 2013

(54) SEPARATED-FLOW TEMPERATURE CONTROL FAUCET

(75) Inventor: Yu-Yu Hsieh, Changhua County (TW)

(73) Assignee: Deluxe Brassware Co., Ltd., Hemei Township, Changhua County (TW)

( * ) Notice: Subject to any disclaimer, the term of this patent is extended or adjusted under 35 U.S.C. 154(b) by 828 days.

(21) Appl. No.: 12/699,366

(22) Filed: Feb. 3, 2010

(65) Prior Publication Data

US 2011/0186642 A1    Aug. 4, 2011

(51) Int. Cl.
*G05D 23/13* (2006.01)

(52) U.S. Cl.
USPC .................... 236/12.1; 236/12.11

(58) Field of Classification Search
USPC ............ 236/12.1, 12.11, 12.16, 12.17, 12.18, 236/12.23, 93 B
See application file for complete search history.

(56) References Cited

U.S. PATENT DOCUMENTS

| | | | |
|---|---|---|---|
| 2,754,061 A * | 7/1956 | Null ............................ | 236/12.11 |
| 7,475,703 B2 * | 1/2009 | Kempf et al. ................. | 137/377 |
| 7,905,424 B2 * | 3/2011 | Li et al. ....................... | 236/12.18 |
| 8,074,894 B2 * | 12/2011 | Beagen ........................ | 236/12.2 |

* cited by examiner

*Primary Examiner* — Marc Norman
(74) *Attorney, Agent, or Firm* — Muncy, Geissler, Olds & Lowe, PLLC

(57) ABSTRACT

A separated-flow temperature control faucet mainly comprises a constant temperature control device to mix hot water and cold water, a flow divider valve to control water flow direction and a main housing coupling with the constant temperature control device and the flow divider valve. The constant temperature control device contains an axial movement member movable axially by turning to control hot and cold water flow amount to control water temperature. The flow divider valve provides water separating function and stop function to stop water from flowing out. The faucet thus formed has a longer life span, is less likely to accumulate water dreg, can supply a greater water discharge amount, stabilize water temperature, and offer a simpler structure and improve usability.

10 Claims, 11 Drawing Sheets

SEPARATED-FLOW TEMPERATURE CONTROL FAUCET

FIELD OF THE INVENTION

The present invention relates to a temperature control faucet and particularly to a separated-flow temperature control faucet equipped with a separated-flow and temperature control structure.

BACKGROUND OF THE INVENTION

Please refer to FIG. 1, a conventional separated-flow bath faucet is provided to preset water discharge temperature of cold and hot water including a temperature control handle 1 to control water discharge of cold and hot water and a plurality of independent water supply handles 2a, 2b and 2c to mate various water outlets such as a shower nozzle 3, a spray head 4 and a spout 5 directing downwards. Through the temperature control handle 1, users can adjust required water temperature, then control water discharge amount through the independent water supply handles 2a, 2b and 2c. Hence users can set the adjusted water flow amount of the temperature control handle 1, and selected blended water amount or ON/OFF can be controlled through the independent water supply handles 2a, 2b and 2c. Water outlet can be used more flexibly. It is a convenient and practical design.

However, the structure of such a separated-flow bath faucet is complicated and also has to be incorporated with multiple sets of independent water supply handles 2a, 2b and 2c. Fabrication and assembly costs are higher and the assembly size is bigger. The multiple independent water supply handles 2a, 2b and 2c can be turned on at the same time to frequently create confusion to users when in use and result in unintended water discharge.

SUMMARY OF THE INVENTION

The primary object of the present invention is to reduce the number of water supply handles and shrink the total size and offer simpler and straightforward operation.

Another object of the invention is to simplify water temperature control structure and improve usability to achieve constant temperature control.

To achieve the foregoing objects, the present invention provides a separated-flow temperature control faucet that comprises a main housing, a constant temperature control device to blend hot water and cold water to become warm water and a flow divider valve located in the main housing. The main housing includes a hot water passage, a cold water passage and a blended water passage. The hot water passage and the cold water passage allow hot water and cold water to flow in respectively. The constant temperature control device is located in the main housing and includes a water intake sleeve communicating with the blended water passage and an axial movement member located in the water intake sleeve. The water intake sleeve has a hot water inlet communicating with the hot water passage and a cold water inlet communicating with the cold water passage. The axial movement member is movable axially to control opening size of the hot water inlet and the cold water inlet.

The flow divider valve includes a blended water inlet to receive the blended water, a rotary valve located in the flow divider valve, a first separated flow orifice linked to the rotary valve, a second separated flow orifice also linked to the rotary valve and a rotary shaft connecting to the rotary valve to turn thereof. The rotary valve has a hole corresponding to the first and second separated flow orifices. The hole can be turned through the rotary shaft to the position where the first separated flow orifice or the second separated flow orifice is. In addition, the hole can also be turned to a stop position between the first and second separated flow orifices to prevent the blended water from flowing out through any separated flow orifice, thereby to stop water supply.

The structure thus formed provides simpler and straightforward operation. By moving the hole, water can be discharged through the first or second separated flow orifice, or at a stop position to stop discharge of the blended water. The flow divider valve is turnable to switch among the first separated flow orifice, second separated flow orifice and stop position. Compared with the conventional technique, the structure of the main housing and flow divider valve are simplified. Thus product defects and assembly cost can be reduced. With the simpler structure and a larger size of the hole of the flow divider valve, a greater water amount can be discharged. The faucet also can be made smaller and is easier to use.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
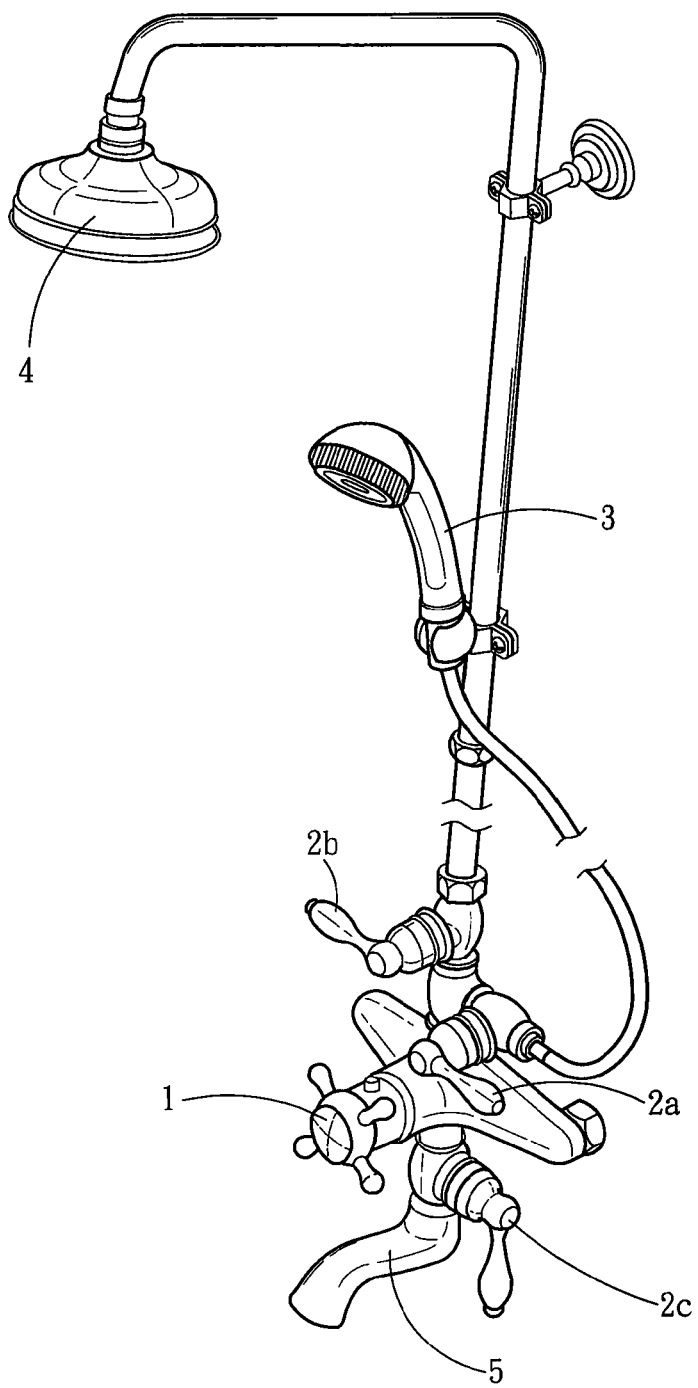
FIG. 1 is a schematic view of a conventional separated-flow bath faucet.
Figure 2:
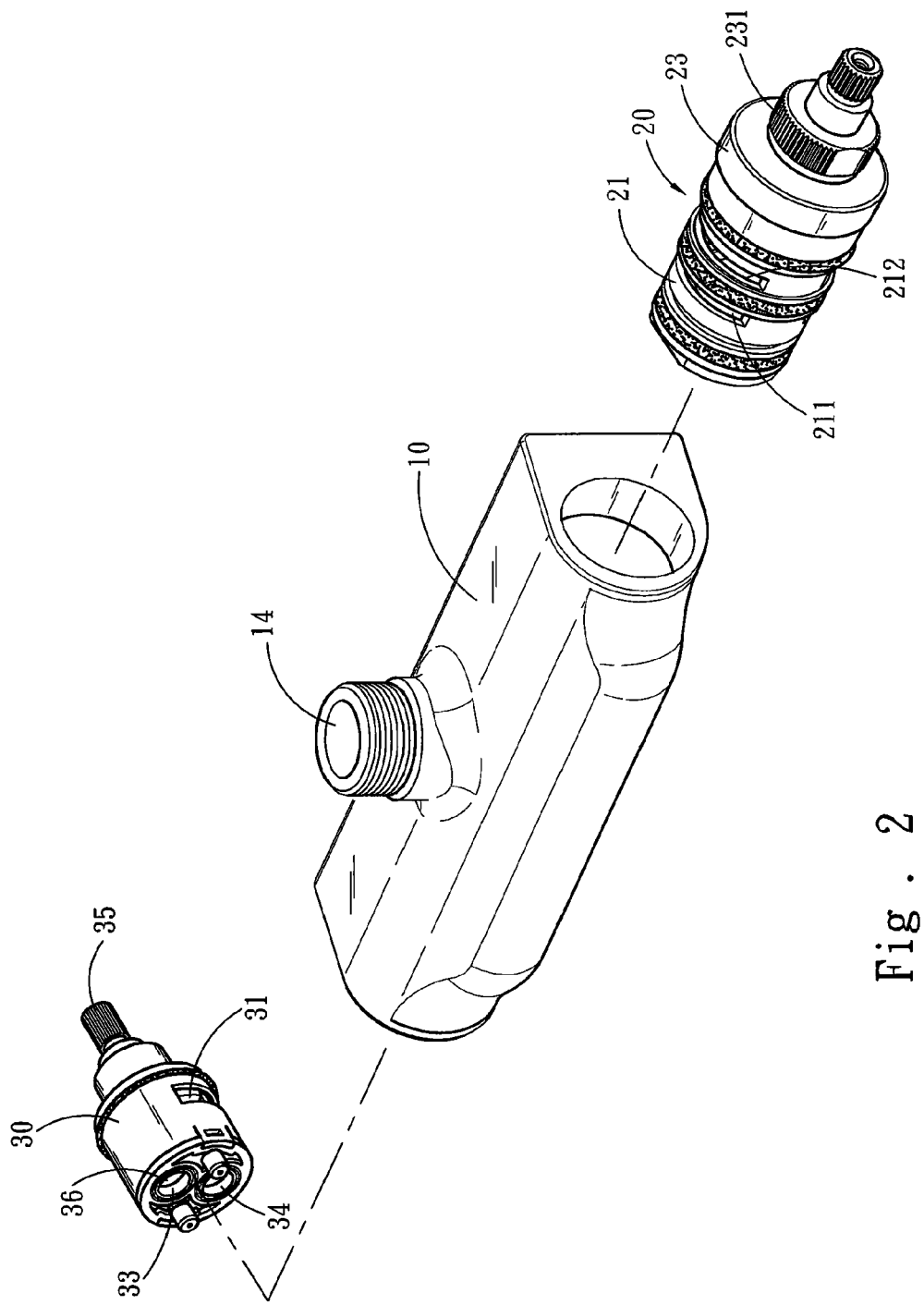
FIG. 2 is an exploded view of an embodiment of the invention.

Please refer to FIGS. 2 through 5, the present invention aims to provide a separated-flow temperature control faucet which comprises a main housing 10, a constant temperature control device 20 to blend hot water and cold water to become warm water and a flow divider valve 30 located in the main housing 10.

The main housing 10 includes a hot water passage 11, a cold water passage 12 and a blended water passage 13. The hot water passage 11 and the cold water passage 12 allow hot water and cold water to flow in respectively.

The constant temperature control device 20 is located in the main housing 10 and includes a water intake sleeve 21 communicating with the blended water passage 13, an axial movement member 22 located in the water intake sleeve 21, and a screwing set 23 to allow the axial movement member 22 to move axially. The water intake sleeve 21 has a hot water inlet 211 communicating with the hot water passage 11 and a cold water inlet 212 communicating with the cold water passage 12. The axial movement member 22 can be moved axially to control opening size of the hot water inlet 211 and the cold water inlet 212. The screwing set 23 is coupled with the water intake sleeve 21 by screwing and has an adjustment portion 231 extensible axially forwards and rearwards to move the axial movement member 22.

The axial movement member 22 has a ceramic layer 221 coated on the surface thereof, a plurality of apertures 222 to allow water to pass through and a temperature sensing bar 223. The ceramic layer 221 is made from gel resin mainly including nano-size silicon dioxide that is abrasive-resistant, smaller friction, acid and alkali resistant, less likely to be clogged by water dreg and has a longer life span. The temperature sensing bar 223 has one end butting the adjustment portion 231 and the other end coupled with and butted by an elastic element 224 held in the water intake sleeve 21 to provide a counterforce to the adjustment portion 231.

In addition, the water intake sleeve 21 has a sealing ring 213 interposed between the hot water inlet 211 and cold water inlet 212. The ceramic layer 221 is closely in contact with the sealing ring 213 to prevent water flowing between the ceramic layer 221 and water intake sleeve 21. Hence the cold water can pass through the apertures 222 to mix with the hot water to become the blended water at a selected temperature. Moreover, the water intake sleeve 21 contains two filters 214 which are respectively located at the hot water inlet 211 and cold water inlet 212 to filter out impurities in the hot water and cold water that enter the water intake sleeve 21. It is to be noted that the description and drawings depicted below aim to explain operation of the constant temperature control device 20, and the filters 214 are omitted to facilitate discussion. In embodiments of the invention, the water intake sleeve is equipped with the filters 214 to filter out the impurities in the water.

Figure 3:
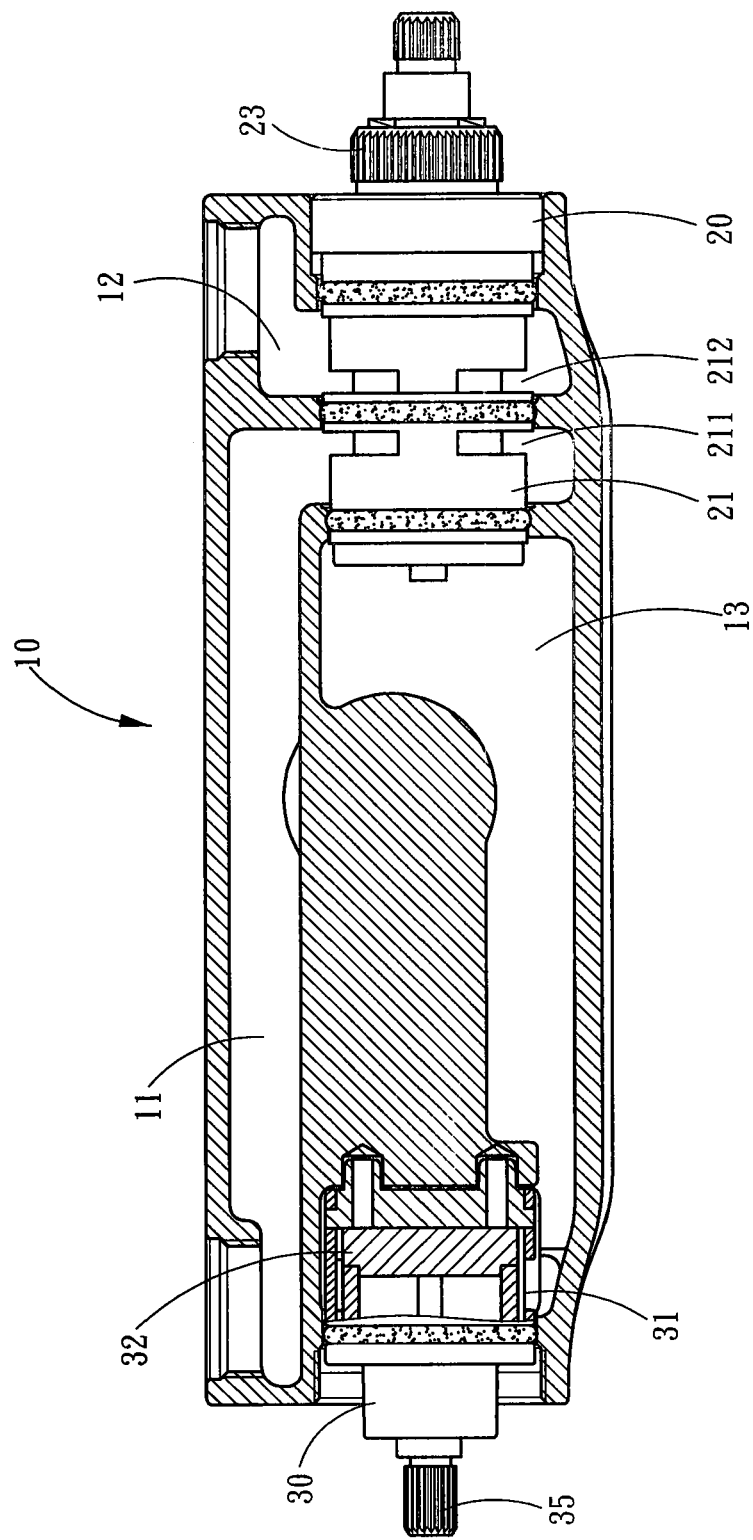
FIG. 3 is a cross section of an embodiment of the main housing of the invention.
Figure 4:
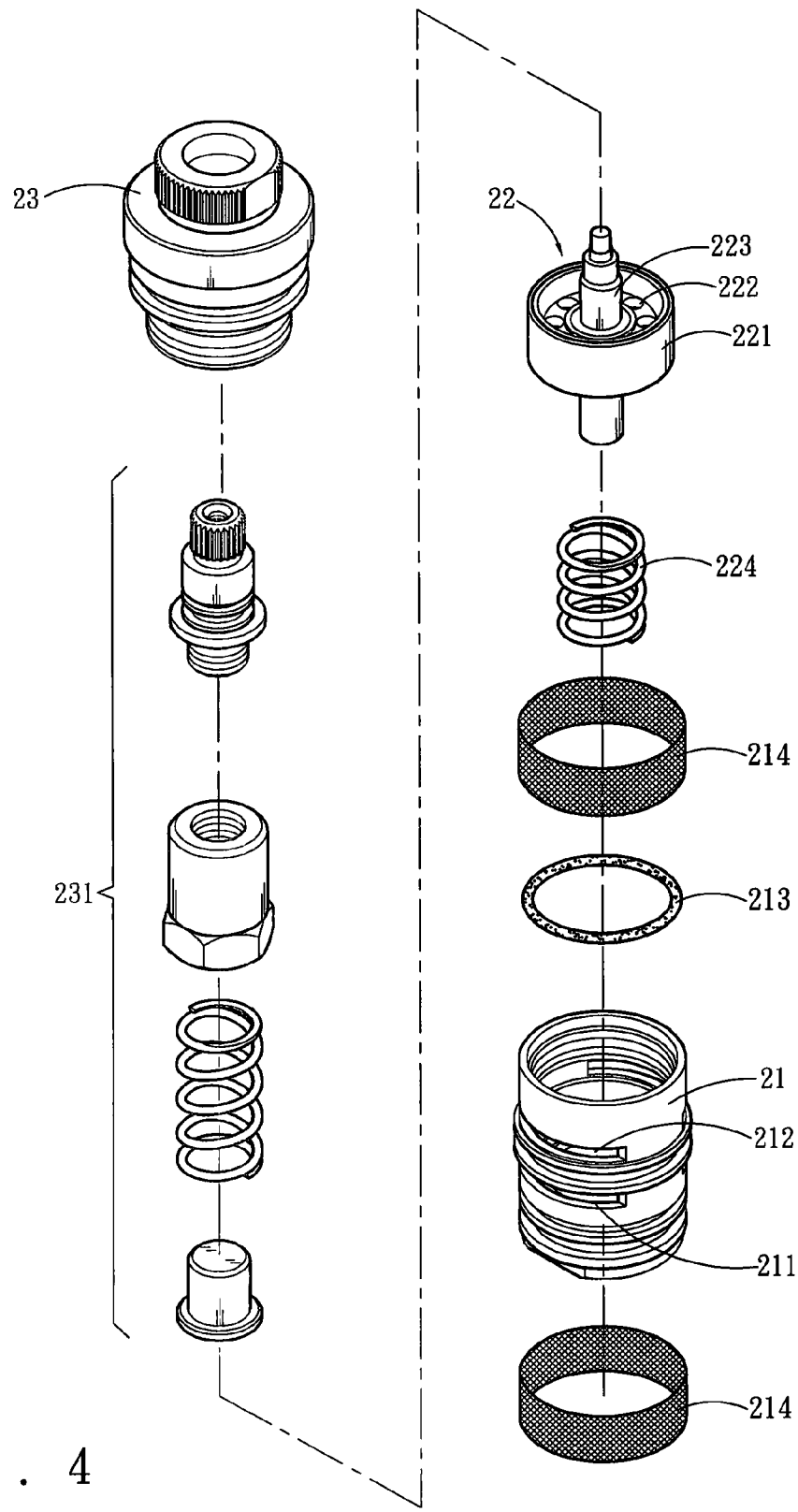
FIG. 4 is an exploded view of an embodiment of the constant temperature control device of the invention.
Figure 5:
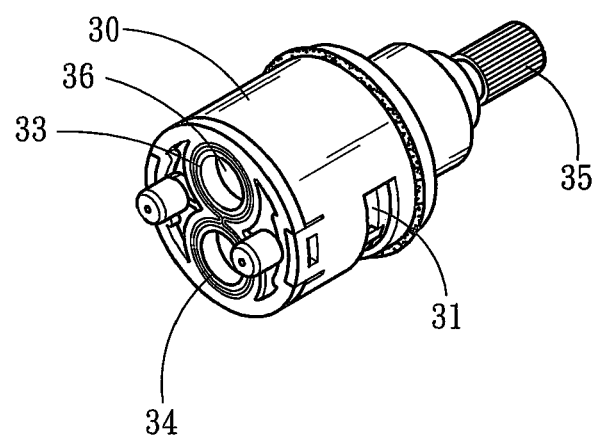
FIG. 5 is a perspective view of an embodiment of the flow divider valve of the invention.

Referring to FIGS. 3 and 5, the flow divider valve 30 includes a blended water inlet 31 for the blended water to flow in, a rotary valve 32 located in the flow divider valve 30, a first separated flow orifice 33 linked to the rotary valve 32, a second separated flow orifice 34 also linked to the rotary valve 32 and a rotary shaft 35 coupling with the rotary valve 32 to turn thereof. The rotary valve 32 has a hole 36 corresponding to the first and second separated flow orifices 33 and 34. The hole 36 can be turned through the rotary shaft 35 to the position where the first separated flow orifice 33 or the second separated flow orifice 34 is to allow the blended water to flow out through the first separated flow orifice 33 or the second separated flow orifice 34.

Figure 6:
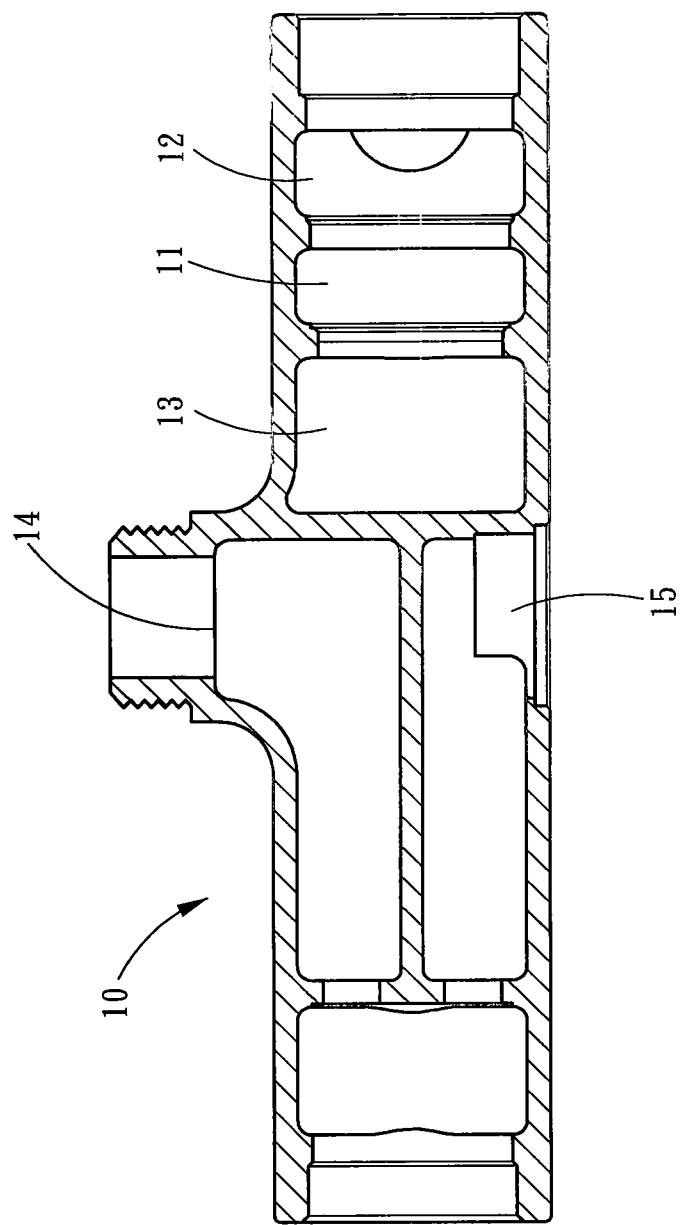
FIG. 6 is a cross section of an embodiment of the main housing of the invention taken at another angle.
Figure 7:
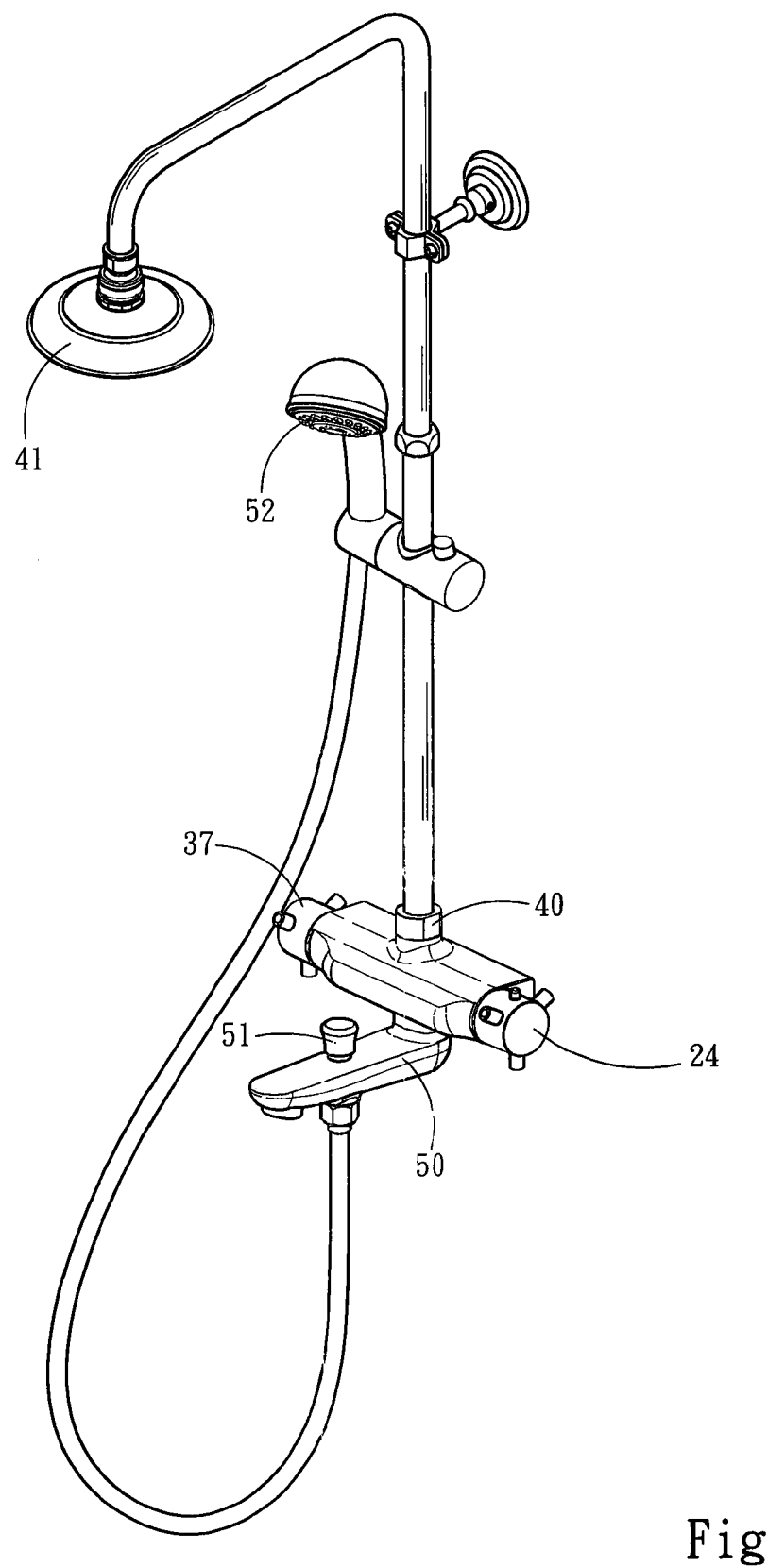
FIG. 7 is a schematic view of an embodiment of the invention in an integral manner.

Referring to FIGS. 6 and 7, the main housing 10 further has an upper water discharge passage 14 and a lower water discharge passage 15 that have respectively one end connecting to the first separated flow orifice 33 and the second separated flow orifice 34. The upper water discharge passage 14 has an upper water connector 40 at the other end extended. The upper water discharge passage 14 has screw threads formed on the surface to connect with a spray head 41 which is fastened to the upper water discharge passage 14 by screwing.

The lower water discharge passage 15 has another end coupled with a lower water discharge duct 50. The blended water can pass through the hole 36 and the second separated flow orifice 34 and the lower water discharge passage 15 to flow out via the lower water discharge duct 50. The lower water discharge duct 50 further has a diverter element 51 and a shower nozzle 52. The blended water flows to the lower water discharge duct 50 or the shower nozzle 52 through switching the diverter element 51, then passes through the lower water discharge duct 50 or shower nozzle 52 to be discharged. To facilitate using, the rotary shaft 35 further is coupled with a turnable handle 37 on the outer side. In addition to enhance appeal, it also provides a greater area on the turning portion to facilitate user grasping. Similarly, the screwing set 23 of the constant temperature control device 20 also has an adjustment handle 24 to facilitate user grasping and turning.

Figure 8A:
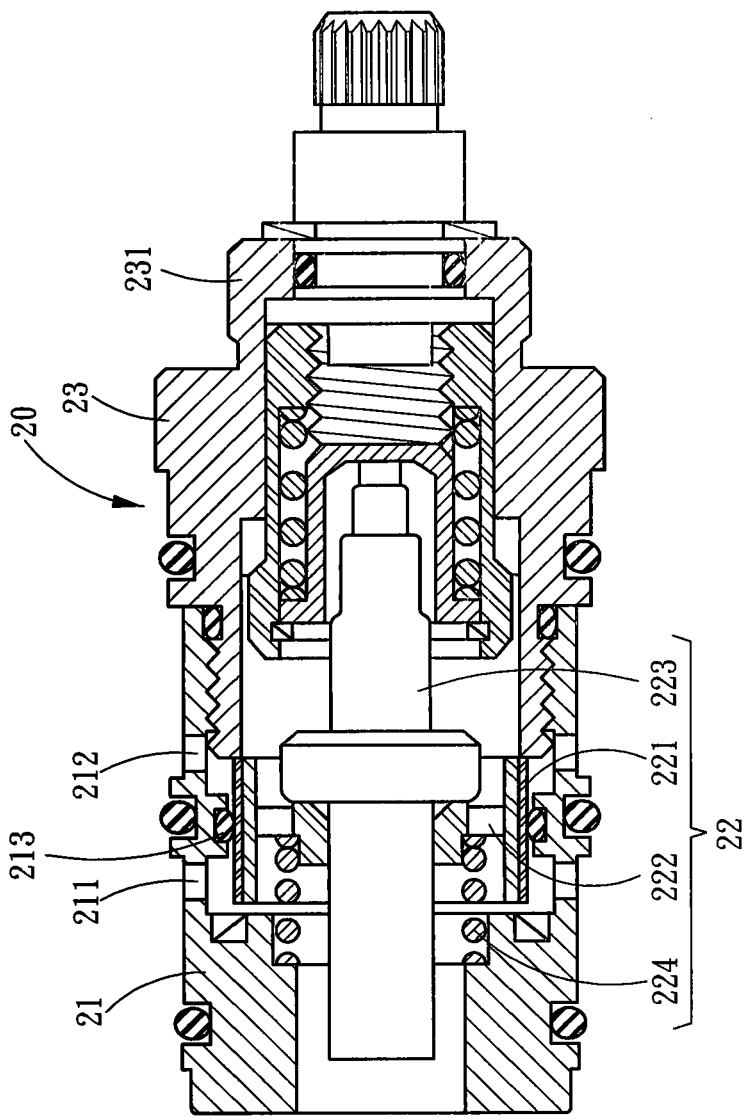
FIG. 8A is a schematic view of an embodiment of the invention showing hot water discharge condition.
Figure 8B:
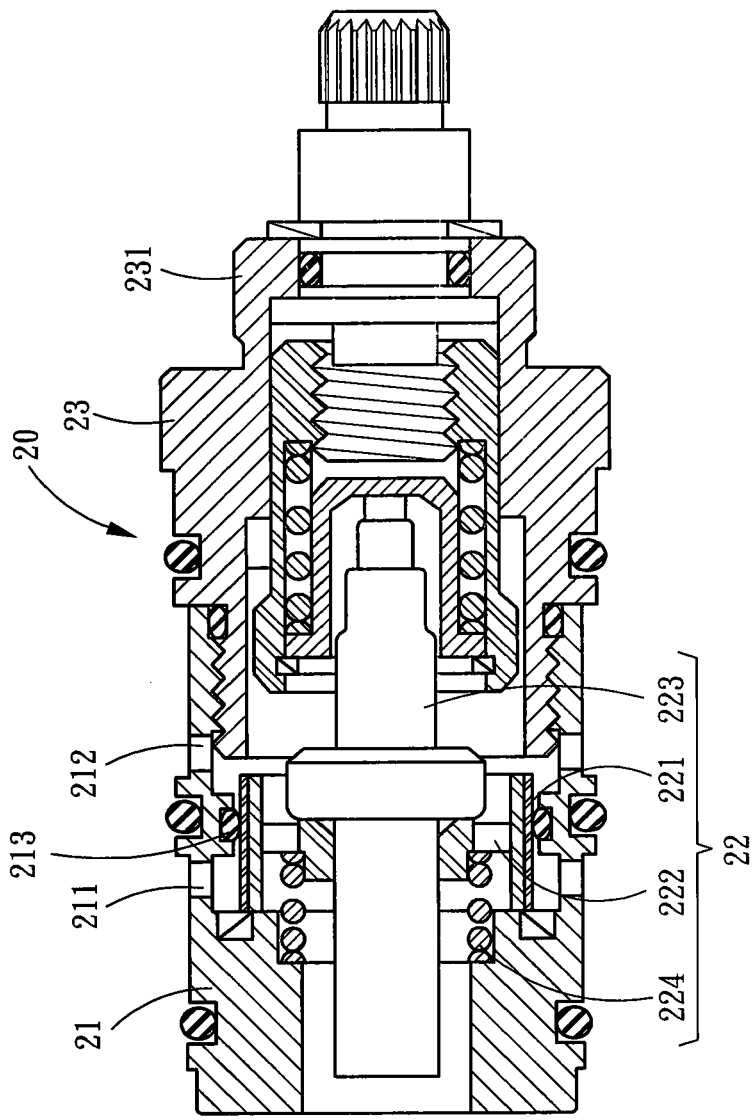
FIG. 8B is a schematic view of an embodiment of the invention showing cold water discharge condition.
Figure 8C:
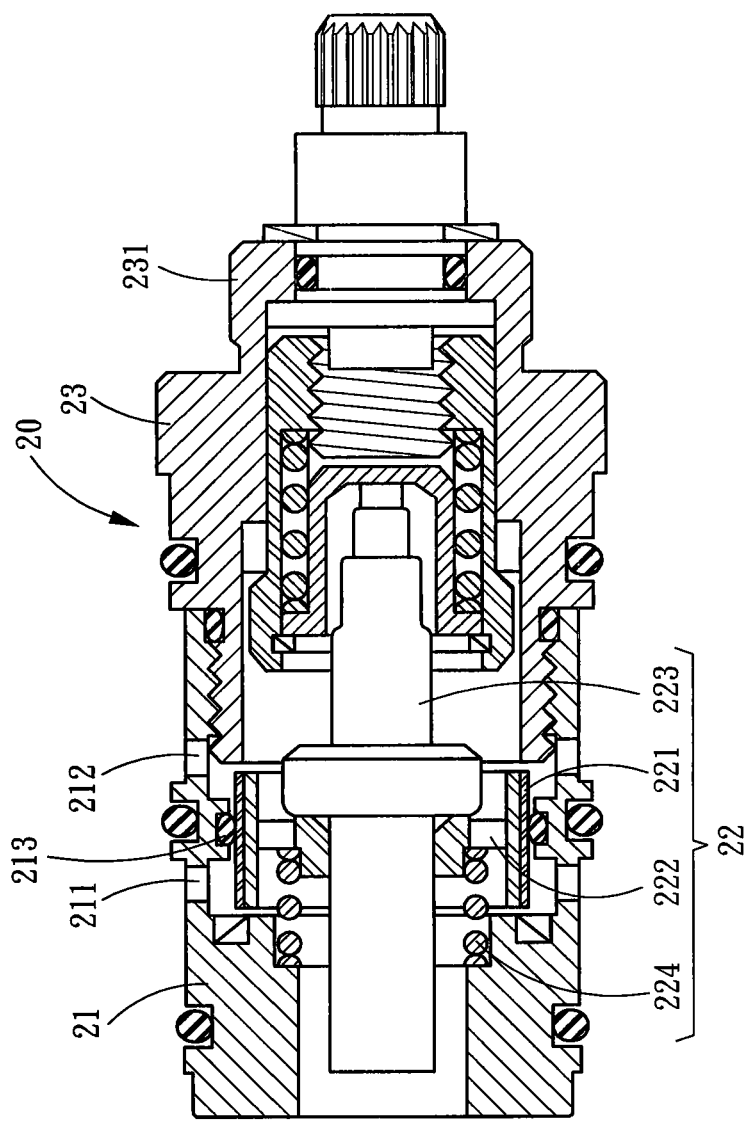
FIG. 8C is a schematic view of an embodiment of the invention showing blended water discharge condition.

Refer to FIGS. 8A through 8C for the constant temperature control device 20 of the invention in operating conditions. In an embodiment shown in FIG. 8A, through turning the adjustment portion 231 of the screwing set 23, the axial movement member 22 is moved axially towards the cold water inlet 212 to shrink the opening thereof.

Referring to FIG. 8B, the axial movement member 22 is moved axially towards the hot water inlet 211 through the adjustment portion 231 to shrink or close the opening of the hot water inlet 211, thereby adjust or close hot water flow amount.

Referring to FIG. 8C, the axial movement member 22 may also be moved between the hot water inlet 211 and cold water inlet 212 so that the hot water inlet 211 and cold water inlet 212 can receive water at the same time. The cold water entered the water intake sleeve 21 passes through the apertures 222 of the axial movement member 22 and enters one end of the hot water inlet 211 to mix with the hot water to become blended water to be discharged. The blended water flows into the blended water inlet 31 of the flow divider valve 30 through the blended water passage 13 to be divided and controlled.

Figure 9A:
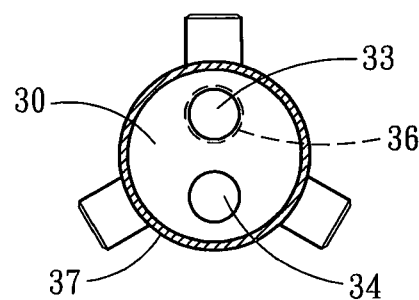
FIG. 9A is a schematic view of an embodiment of the first separated flow of the invention.
Figure 9B:
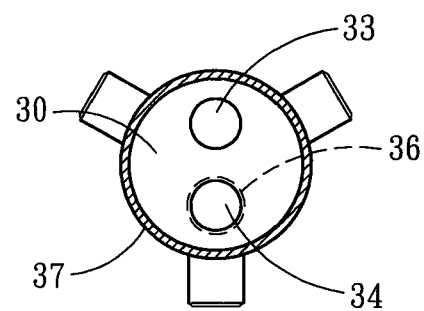
FIG. 9B is a schematic view of an embodiment of the second separated flow of the invention.
Figure 9C:
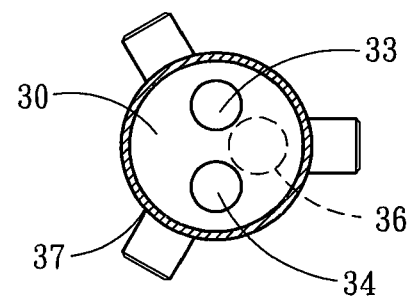
FIG. 9C is a schematic view of an embodiment of the flow stop of the invention.

Referring to FIG. 9A, also FIGS. 3 and 5, when in use, the flow divider valve 30 can be set in three operating conditions, including a first separated flow condition in which the rotary shaft 35 is turned to move the hole 36 to the first separated flow orifice 33, the blended water passes through the hole 36 to flow out from the first separated flow orifice 33. Referring to FIG. 9B, turn the rotary shaft 35 to move the hole 36 to the second separated flow orifice 34 in a second separated flow condition in which the blended water flows out though the second separated flow orifice 34. Referring to FIG. 9C, turn the hole 36 to the stop position between the first separated flow orifice 33 and second separated flow orifice 34 in a flow stop condition, then the blended water cannot flow out through the hole 36 outside the flow divider valve 30. Thus the blended water can be stopped without flowing out through any separated flow orifice to stop water discharge.

It is to be noted that the blended water previously discussed not merely means the water mixed by the hot water and cold water. As the blended water passage 13 in the main housing 10 receives water flown out from the constant temperature control device 20, and the constant temperature control device 20 can provide pure cold water intake, the blended water is not limited by mixing the hot water and cold water.

As a conclusion, the invention not only can reduce the number of water supply handles and shrink total size, also provide simpler and straightforward operation. By moving the hole 36, water can be discharged through the first separated flow orifice 33 or the second separated flow orifice 34. The hole 36 also can be turned to the stop position to stop discharge of the blended water. Hence there is no need to individually adjust the hot and cold water handles. Usability improves. Compared with the conventional technique, the main housing 10 and flow divider valve 30 are simplified in structure, thus product defects can be reduced and fabrication and assembly costs are lower. Because of the simpler structure, the hole 36 in the flow divider valve 30 can be made larger to increase water discharge amount. Total size of the faucet also can be shrunk. Operation is simpler. Moreover, since the rotary valve 32 is made from ceramic, the ceramic layer 221 on the surface of the axial movement member 22 has a smooth surface to reduce the friction with the water intake sleeve 21. The flow divider valve 30 and the constant temperature control device 20 are abrasive-resistant, acid and alkali resistant, malfunction and clogged by water dreg are less likely to occur, and life span is longer. Repair or replacement probability is lower, and maintenance cost can be reduced. It provides a significant improvement over the conventional technique.

What is claimed is:

1. A separated-flow temperature control faucet, comprising:
   a main housing including a hot water passage, a cold water passage and a blended water passage, the hot water passage and the cold water passage respectively allowing hot water and cold water to enter;
   a constant temperature control device which is connected with the main housing and mixes the hot water and the cold water to become blended water, including a water intake sleeve connecting to the blended water passage and an axial movement member located in the water intake sleeve, the water intake sleeve including a hot water inlet connecting to the hot water passage and a cold water inlet connecting to the cold water passage, the axial movement member being movable axially to control opening size of the hot water inlet and the cold water inlet; and
   a flow divider valve which communicates with the blended water passage in the main housing to control flow direction of the blended water and includes a blended water inlet to receive the blended water, a rotary valve located in the flow divider valve, a first separated flow orifice linked to the rotary valve, a second separated flow orifice linked to the rotary valve and a rotary shaft connecting to the rotary valve for turning, the rotary valve including a hole corresponding to the first separated flow orifice and second separated flow orifice.

2. The separated-flow temperature control faucet of claim 1, wherein the axial movement member includes a ceramic layer coated on the surface thereof.

3. The separated-flow temperature control faucet of claim 2, wherein the water intake sleeve includes a sealing ring located between the hot water inlet and the cold water inlet, the ceramic layer being closely in contact with the sealing ring to prevent water from flowing between the ceramic layer and the water intake sleeve.

4. The separated-flow temperature control faucet of claim 3, wherein the axial movement member includes a plurality of apertures to allow the water to pass through.

5. The separated-flow temperature control faucet of claim 1, wherein the constant temperature control device includes a screwing set to allow the axial movement member to move axially, the screwing set including an adjustment portion extensible axially forwards and rearwards to move the axial movement member.

6. The separated-flow temperature control faucet of claim 5, wherein the screwing set is coupled with the water intake sleeve by screwing.

7. The separated-flow temperature control faucet of claim 5, wherein the axial movement member includes a temperature sensing bar which has one end butting the adjustment portion of the screwing set and the other end coupled with and butted by an elastic element in the water intake sleeve.

8. The separated-flow temperature control faucet of claim 5, wherein the screwing set is coupled with an adjustment handle to be grasped by a user for turning.

9. The separated-flow temperature control faucet of claim 1, wherein the hole on the rotary valve is moved to a stop position by turning the rotary shaft, the stop position being located between the first separated flow orifice and the second separated flow orifice.

10. The separated-flow temperature control faucet of claim 1, wherein the main housing further includes an upper water discharge passage and a lower water discharge passage that contain respectively one end connecting to the first separated flow orifice and the second separated flow orifice.

* * * * *